UNITED STATES PATENT OFFICE.

JOHN C. H. CLAUSSEN, OF CHARLESTON, SOUTH CAROLINA.

IMPROVEMENT IN COLORING GRAIN AND SEEDS FOR SOWING.

Specification forming part of Letters Patent No. 122,757, dated January 16, 1872.

Specification describing a new and useful Improvement in Coloring Grain and Seeds for Sowing, invented by JOHN C. H. CLAUSSEN, of Charleston, in the county of Charleston and State of South Carolina.

My invention has for its object to furnish an improvement in preparing grain and seeds for sowing, so as to enable farmers and gardeners to see the seeds as they lie upon the ground, to enable them to sow uniformly and in proper quantity; and it consists in coloring the grain and seeds with flour or other suitable substance, as hereinafter more fully described.

In preparing the grain or seeds for sowing they are first wet or moistened with water and are then rolled in flour or other suitable material until they are thoroughly coated. In the case of very smooth seeds a little molasses may be mixed with the water to cause the coloring material to adhere better. The grain and seeds are not injured by this process, as the coating absorbs the water, which may be further expelled, when the seeds are not to be immediately sown, by exposing them to the sun. This coating enables the seed to be readily seen while lying upon the ground, both when sown broadcast and when sown in drills, so that the sower can see whether the seed be sown uniformly and in proper quantity. This is especially important in the case of seeds sown in drills, as the plants will not be crowded, and will grow better, and will not have to be thinned out so much. The coating also absorbs and holds moisture, and thus quickens the germination of the seeds, and also acts as a fertilizer to support the young plant.

Having thus described my invention, I claim as new and desire to secure by Letters Patent—

Grain and seeds colored or coated with flour or other suitable substance, substantially in the manner and for the purpose herein set forth and described.

JOHN C. H. CLAUSSEN.

Witnesses:
 ALEX. F. ROBERTS,
 P. C. DIETRICH. (133)